United States Patent
Iizuka et al.

(10) Patent No.: US 7,433,095 B2
(45) Date of Patent: Oct. 7, 2008

(54) REFLECTIVE SCANNING OPTICAL SYSTEM

(75) Inventors: Takashi Iizuka, Saitama-ken (JP); Shohei Matsuoka, Tokyo (JP)

(73) Assignee: Hoya Corporation, Tokyo (JP)

( * ) Notice: Subject to any disclaimer, the term of this patent is extended or adjusted under 35 U.S.C. 154(b) by 1017 days.

(21) Appl. No.: 10/867,808

(22) Filed: Jun. 16, 2004

(65) Prior Publication Data

US 2004/0257429 A1    Dec. 23, 2004

(30) Foreign Application Priority Data

Jun. 17, 2003  (JP)  ............................. 2003-172096

(51) Int. Cl.
*H04N 1/04*  (2006.01)
*H04N 1/46*  (2006.01)

(52) U.S. Cl. ...................... 358/481; 358/490; 358/474; 358/511

(58) Field of Classification Search ................ 358/481, 358/490, 474, 511; 359/205, 204; 347/232
See application file for complete search history.

(56) References Cited

U.S. PATENT DOCUMENTS

| | | | |
|---|---|---|---|
| 5,621,562 A | 4/1997 | Hama | |
| 5,648,865 A | 7/1997 | Iizuka | |
| 5,712,719 A | 1/1998 | Hama | |
| 5,748,354 A | 5/1998 | Iizuka | |
| 5,825,403 A | 10/1998 | Iima et al. | |
| 5,883,732 A * | 3/1999 | Takada et al. | ............... 359/207 |
| 6,643,044 B1 | 11/2003 | Iizuka | |
| 6,987,594 B2 * | 1/2006 | Takayama | ................... 359/205 |
| 7,158,269 B2 * | 1/2007 | Morita | ........................ 358/481 |
| 7,355,765 B2 * | 4/2008 | Yoshida | ...................... 358/501 |

FOREIGN PATENT DOCUMENTS

| | | |
|---|---|---|
| JP | 7-191272 | 7/1995 |
| JP | 8-262323 | 10/1996 |
| JP | 10-54952 | 2/1998 |

* cited by examiner

*Primary Examiner*—Houshang Safaipour
(74) *Attorney, Agent, or Firm*—Greenblum & Bernstein, P.L.C.

(57) ABSTRACT

In a reflective scanning optical system employing an imaging optical system having a curved mirror with a rotationally symmetrical reflecting surface configuration, the change in magnification of the imaging optical system in the auxiliary scanning direction is reduced and thereby the beam spot diameter on the scan target surface is equalized, as well as equalizing the scan line interval on the scan target surface when the system is applied to a multibeam scanning optical system. The imaging optical system of the reflective scanning optical system includes a curved mirror with a rotationally symmetrical reflecting surface and a lens having an anamorphic lens surface configuration on its one side. In the anamorphic lens surface configuration, slope and curvature of the line of intersection of the lens surface and a plane parallel to the auxiliary scanning cross section change independently of each other as the position in the main scanning direction changes.

8 Claims, 8 Drawing Sheets

REFLECTIVE SCANNING OPTICAL SYSTEM

BACKGROUND OF THE INVENTION

The present invention relates to a reflective scanning optical system for scanning a laser beam on a scan target surface by dynamically deflecting the laser beam using a revolving polygon mirror and focusing the dynamically deflected laser beam on the scan target surface using an imaging optical system including a curved mirror.

A scanning optical system scans a laser beam in a main scanning direction on a scan target surface (e.g. outer circumferential surface of a photosensitive drum) generally by revolving a polygon mirror (having the shape of a polygonal prism) about its central axis and letting each lateral face of the revolving polygon mirror deflect the laser beam dynamically. When the scan target surface itself is moved in an auxiliary scanning direction which is orthogonal to the main scanning direction, a plurality of linear traces (scan lines) are formed on the scan target surface at even intervals. Therefore, if the laser beam has been ON-OFF modulated according to image information, a two-dimensional image is formed on the scan target surface.

In conventional scanning optical systems, an imaging optical system having an fθ lens group for the correction of scan speed is generally placed between the revolving polygon mirror and the scan target surface in order to let the laser beam (dynamically deflected by the polygon mirror revolving at a constant angular speed) be scanned on the scan target surface at a constant speed.

Recently, reflective scanning optical systems, employing a curved mirror instead of the fθ lens group of the imaging optical system, have been proposed, from which reduction of chromatic aberration and miniaturization of the system can be expected. The imaging optical system equipped with the curved mirror has the same functions (scan speed correction function, field curvature correction function and optical face angle error correction function) as the conventional imaging optical system equipped with the fθ lens group (see Japanese Patent Provisional Publication No. HEI07-191272. for example).

Incidentally, in generally-used scanning optical systems (including the reflective scanning optical systems), the optical path length of the laser beam before being focused on the scan target surface varies depending on the incident position of the laser beam on the imaging optical system measured in the main scanning direction. Therefore, the magnification of the imaging optical system in the auxiliary scanning direction might change depending on the incident position of the laser beam on the imaging optical system measured in the main scanning direction, by which the convergence angle of the laser beam in the auxiliary scanning direction (which corresponds to the NA (Numerical Aperture)) might vary as the laser beam is scanned. Since the convergence angle of the beam focusing on the scan target surface corresponds to the so-called F number, the variation in the convergence angle will hereinafter be called "F number variation". The F number variation eventually causes a change in the spot diameter (diameter of a beam spot formed by the laser beam focusing on the scan target surface).

Further, in cases where such an imaging optical system is employed for a so-called multibeam optical system which dynamically deflects a plurality of beams simultaneously, not only the spot diameter but also the interval between the scan lines changes.

In order to resolve the above problems, the assignee of the present invention has proposed a reflective scanning optical system which can cancel out the change in the spot diameter caused by the F number variation by use of the field curvature (curvature of field, image surface curvature) in the auxiliary scanning direction (see Japanese Patent Provisional Publication No. HEI08-262323, for example). However, in such a reflective scanning optical system, an extremely high accuracy is required of the assembly process and even a slight assembly error might ruin expected effects.

Therefore, the assignee has further proposed a reflective scanning optical system capable of reducing the change in the magnification of the imaging optical system in the auxiliary scanning direction and the F number variation accompanying the change by use of a curved mirror having a particular surface shape whose refractive power in the auxiliary scanning direction changes depending on the position in the main scanning direction (see Japanese Patent Provisional Publication No.HEI10-54952, for example). By such a reflective scanning optical system, the spot diameter on the scan target surface can be maintained constant, and in multibeam scanning optical systems, the interval between the scan lines on the scan target surface can also be made even.

However, employing a complex surface shape for the curved mirror as above drives up manufacturing cost of the curved mirror, increasing the total cost of the reflective scanning optical system. For this reason, the employment of the imaging optical system having the curved mirror of the complex surface shape has been practically difficult.

SUMMARY OF THE INVENTION

The present invention is advantageous in that an improved reflective scanning optical system is provided, which employs an imaging optical system having a curved mirror and a lens having an anamorphic lens surface shape, is capable of reducing the change in the magnification of the imaging optical system in the auxiliary scanning direction and thereby equalizing the beam spot diameter on the scan target surface and also equalizing the scan line interval on the scan target surface when such an imaging optical system is applied to a multibeam scanning optical system.

In accordance with a first aspect of the present invention, in a reflective scanning optical system for dynamically deflecting a laser beam emitted from a light source by each reflecting surface of a polygon mirror revolving at a constant angular speed and thereby scanning the laser beam on a scan target surface at a constant speed in a main scanning direction via an imaging optical system including a curved mirror for reflecting the dynamically deflected laser beam and an elongate lens on which the laser beam reflected by the curved mirror is incident (the laser beam being incident upon each reflecting surface of the revolving polygon mirror and the reflecting surface of the curved mirror at specific angles in an auxiliary scanning direction which is orthogonal to the main scanning direction), the reflecting surface of the curved mirror has positive refractive power in the main scanning direction and the elongate lens has positive refractive power in the auxiliary scanning direction. At least one lens surface of the elongate lens is formed as a rotationally asymmetric surface on which slope and curvature of a line of intersection of the lens surface and a plane parallel to an auxiliary scanning cross section, as a plane containing an optical surface reference axis of the lens surface and parallel to the auxiliary scanning direction, change as the plane gets further from the auxiliary scanning cross section in the main scanning direction so that magnification of the imaging optical system in the auxiliary scanning direction for the laser beam will be constant regardless of the angle of deflection by the revolving polygon mirror.

Therefore, the F number variation can be eliminated even when a simple surface configuration (rotationally symmetrical surface, surface without power in the auxiliary scanning direction, etc.) is employed for the reflecting surface of the curved mirror of the imaging optical system. Since refracting surfaces (lens surfaces) are less susceptible than reflecting surfaces (mirror surfaces) to manufacturing errors (concretely, surface susceptibility of a reflecting surface is four times as high as that of a refracting surface, and ill effect of manufacturing errors on a reflecting surface is four times as significant as that on a refracting surface), employing a complex surface configuration for a lens surface (refracting surface) is far better and easier than employing a complex surface configuration for a mirror surface (reflecting surface).

Preferably, the reflective scanning optical system is composed so that slope $\beta_0$ of a normal line to the rotationally asymmetric surface at a reference point, as the intersection of the optical path of the laser beam and the rotationally asymmetric surface on the auxiliary scanning cross section, relative to the optical surface reference axis measured on the auxiliary scanning cross section and slope $\beta_y$ of a normal line to the rotationally asymmetric surface at a point on the rotationally asymmetric surface a distance y apart from the reference point in the main scanning direction and on the optical path of the laser beam relative to the optical surface reference axis measured on a plane parallel to the auxiliary scanning cross section will satisfy the following conditions (1) and (2):

$$0.70 < \beta_{ymax}/\beta_0 < 0.85 \quad (1)$$

$$0.85 < \beta_{0.5ymax}/\beta_0 < 0.95 \quad (2)$$

where $y_{max}$ denotes the maximum value of the distance y within a scan range as a range on the rotationally asymmetric surface through which the laser beam focusing on the scan target surface passes and $0.5y_{max}$ denotes the half value of the maximum distance $y_{max}$. By the above composition, the F number variation can be suppressed effectively.

More preferably, the reflective scanning optical system is composed so that curvature $CZ_0$ of a line of intersection of the rotationally asymmetric surface and the auxiliary scanning cross section at the reference point and curvature $CZ_{ymax}$ of a line of intersection of the rotationally asymmetric surface and a plane parallel to the auxiliary scanning cross section at the point the maximum distance $y_{max}$ apart from the reference point in the main scanning direction and on the optical path of the laser beam will satisfy the following condition (3):

$$0.75 < CZ_{ymax}/CZ_0 < 0.85 \quad (3)$$

By the above composition, the F number variation can be suppressed more effectively.

More preferably, the other lens surface of the eleongate lens opposite to the rotationally asymmetric surface is formed as a rotationally symmetrical aspherical surface, and magnification $mz_0$ of the imaging optical system in the auxiliary scanning direction on the optical surface reference axis and magnification mz of the imaging optical system in the auxiliary scanning direction for the laser beam focusing on the scan target surface at any image height satisfy the following condition (4):

$$0.9 < mz/mz_0 < 1.1 \quad (4)$$

The reflective scanning optical system in accordance with the present invention may either be implemented as a system dynamically deflecting a single laser beam or a system dynamically deflecting a plurality of laser beams simultaneously (multibeam scanning optical system). In the case of a multibeam scanning optical system, not only the spot diameter on the scan target surface but also the scan line interval on the scan target surface can be equalized.

DESCRIPTION OF THE EMBODIMENTS

Referring now to the drawings, a description will be given in detail of preferred embodiments in accordance with the present invention. Incidentally, while imaging optical systems which will be described below in accordance with the present invention can be installed in a variety of scanning optical systems such as the so-called multibeam scanning optical systems (dynamically deflecting a plurality of laser beams simultaneously), examples of application to a single-beam scanning optical system (dynamically deflecting a laser beam) will be described in the following description for the sake of simplicity.

Figure 1:
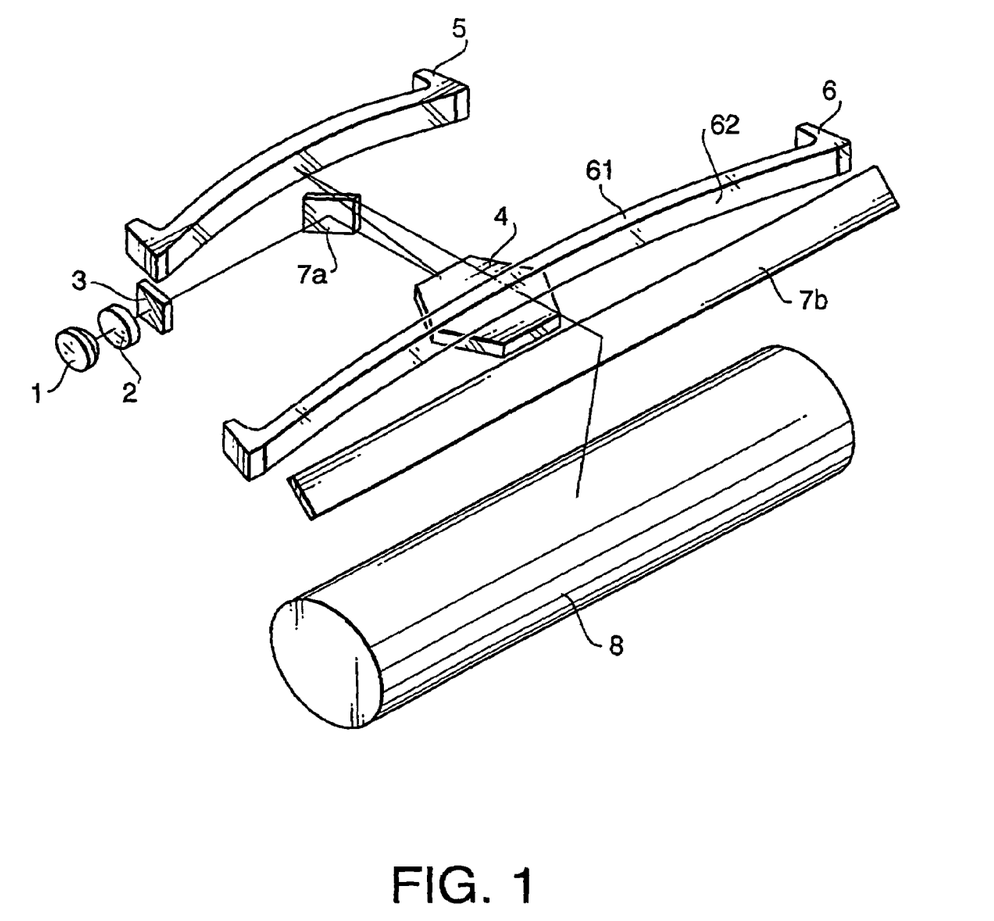
FIG. 1 is a perspective view schematically showing the overall composition of a reflective scanning optical system in accordance with an embodiment of the present invention.
Figure 2:
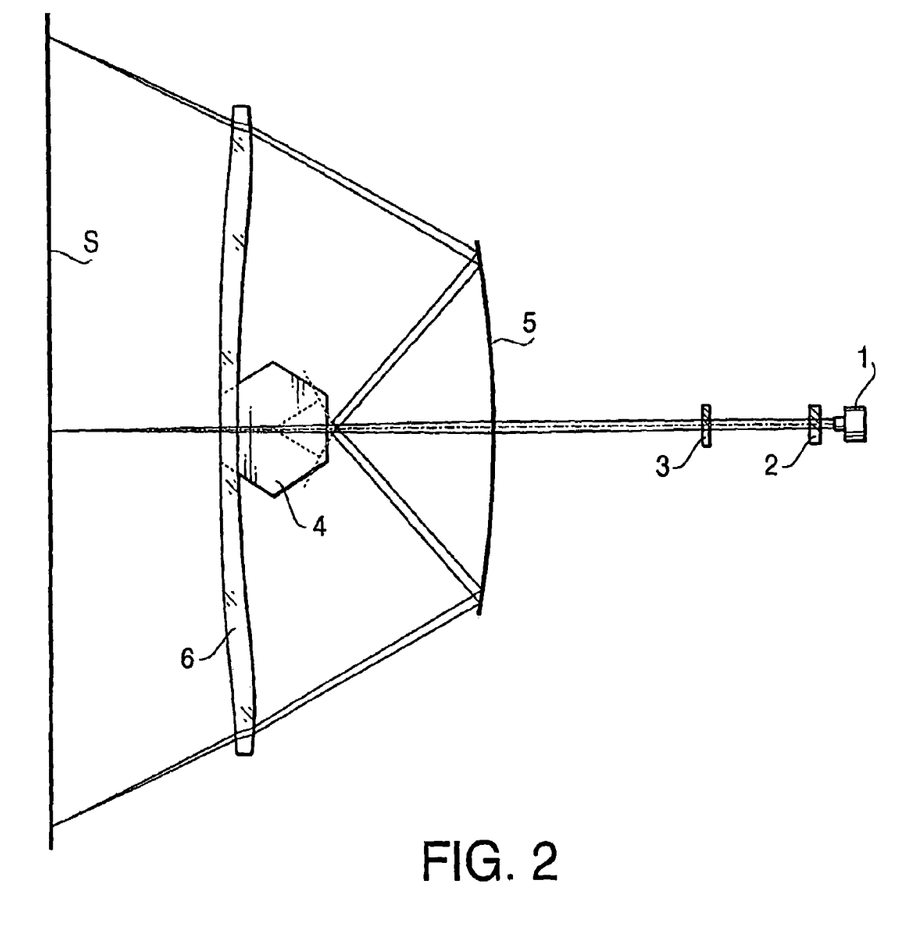
FIG. 2 is a schematic diagram of a principal part of the reflective scanning optical system of the embodiment (first example) seen in the auxiliary scanning direction.
Figure 3:
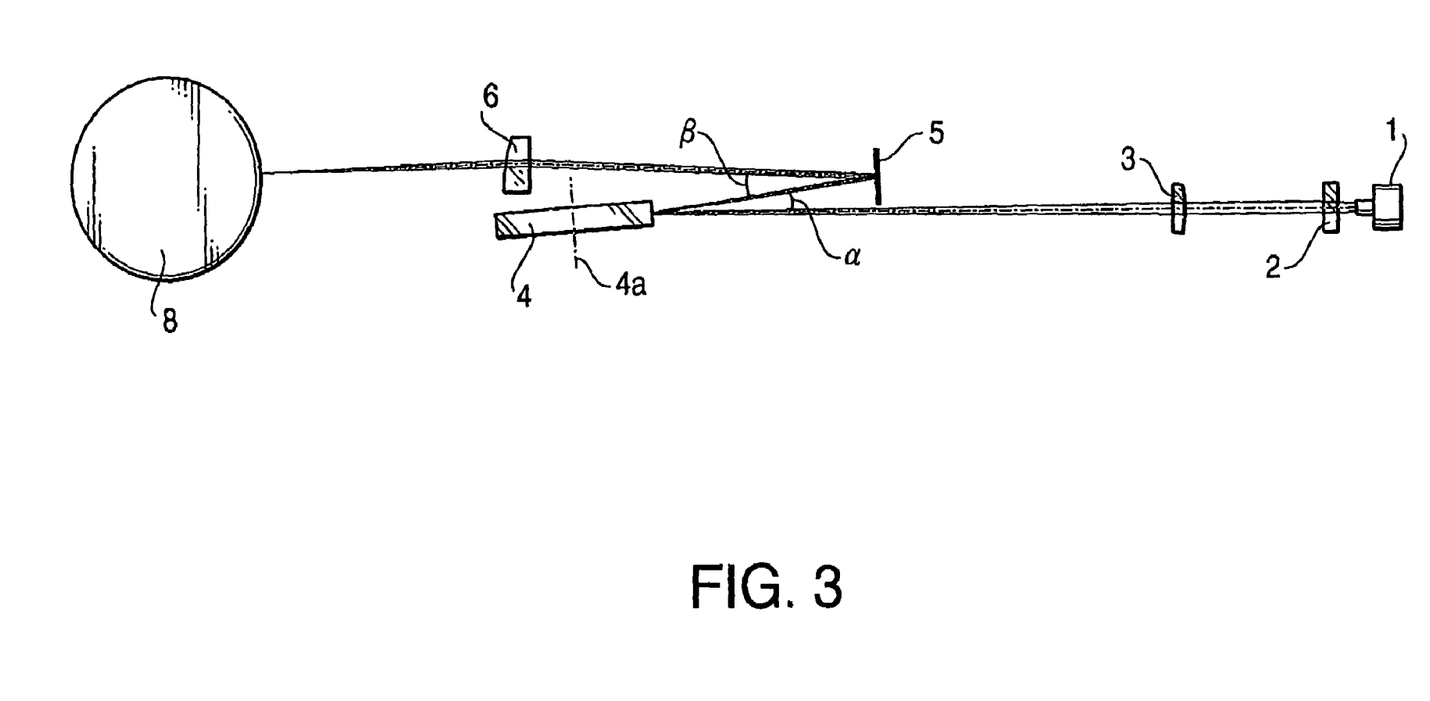
FIG. 3 is a schematic diagram of the principal part of the reflective scanning optical system of the embodiment (first example) seen in the main scanning direction.

FIG. 1 is a perspective view schematically showing the overall composition of a reflective scanning optical system in accordance with an embodiment of the present invention. As shown in FIG. 1, in the scanning optical system of this embodiment, the optical path of the laser beam emerging from a cylindrical lens 3 and the optical path of the laser beam after being dynamically deflected by a polygon mirror 4 are bent by bending mirrors 7a and 7b, respectively. The scanning optical system employs the bending mirrors 7a and 7b in order to downsize the devices (printers, etc.) in which the scanning optical system is installed. FIG. 2 is a schematic diagram of a principal part of the reflective scanning optical system of this embodiment seen in the auxiliary scanning direction. FIG. 3 is a schematic diagram of the principal part of the reflective scanning optical system of this embodiment seen in the main scanning direction. As shown in FIGS. 1-3, the reflective scanning optical system includes a laser light source 1, a collimator lens 2, the cylindrical lens 3, the polygon mirror 4, a curved mirror 5, an anamorphic lens 6 (elongate lens), the bending mirrors 7a and 7b, and a photosensitive drum 8 having an outer surface serving as the scan target surface S.

For the sake of easy and clear explanation, the "auxiliary scanning direction" is basically defined as the direction parallel to the central axis 4a of the polygon mirror 4, and the "main scanning direction" is basically defined as a direction orthogonal to the auxiliary scanning direction or the direction of main scan by the polygon mirror 4. The "main scanning direction" can be defined not only at the polygon mirror 4 but also at any point on the optical path of the laser beam, as a direction regarding the main scan of the laser beam, that is, the direction in which the laser beam is dynamically deflected by the polygon mirror 4 or the direction in which the laser beam moves according to the revolution of the polygon mirror 4. The "auxiliary scanning direction" can also be defined at any point on the optical path of the laser beam as a direction orthogonal to the main scanning direction.

The laser light source 1 is a semiconductor laser (laser diode) which emits the laser beam. The collimator lens 2 is a lens which transforms (collimates) the laser beam emitted by the laser light source 1 as a diverging beam into a parallel beam. The cylindrical lens 3 is a lens having positive refractive power only in the auxiliary scanning direction, by which a line image stretching in the main scanning direction is formed in the vicinity of a reflecting surface of the polygon mirror 4. The polygon mirror 4 is formed in the shape of a low-profile regular hexagonal prism with its six lateral faces as the reflecting surfaces. The polygon mirror 4 is revolved around its central axis 4a at a constant angular speed.

The curved mirror 5 is a mirror with a reflecting surface in a rotationally symmetrical aspherical shape (aspherical surface having rotational symmetry about its optical axis, with a sectional shape expressed by a function of the distance from the optical axis). The curved mirror 5 has refractive power for converging the laser beam (which has been dynamically deflected by the polygon mirror 4).

The anamorphic lens 6 is a lens having an anamorphic lens surface configuration at least on one lens surface. The anamorphic lens 6 is used together with the curved mirror 5 to achieve the same functions (scan speed correction function, field curvature correction function, and facet error correction function) as the fθ lens group (conventional imaging optical system).

In the anamorphic lens 6, an incident surface 61 (upon which the laser beam is incident) or an exit surface 62 (from which the laser beam emerges) is a rotationally asymmetrical surface which is a surface without the rotational symmetry axis. A term "optical surface reference axis" will hereinafter be used for an axis that passes through an origin of an optical surface (which is set when the configuration of the optical surface is described by an equation) and that coincides with a chief ray of the laser beam, which is directed to the center of the scanning area, when the laser beam is directed from the curved mirror 5 to the anamorphic lens 6. In this specification, when each optical surface is expressed with equations, an intersecting point where the optical reference axis intersects the optical surface will be referred to as an origin of the equations. For the sake of easy and clear explanation, a plane that contains the optical surface reference axis (optical axis) and is parallel to the auxiliary scanning direction will hereinafter be referred to as an "auxiliary scanning cross section". Incidentally, the anamorphic lens 6 is placed so that its optical surface reference axis will be coaxial in the main scanning direction with the symmetry axis of the curved mirror 5.

One lens surface of the anamorphic lens 6 is a rotationally symmetrical aspherical surface (aspherical surface having the rotational symmetry), while the other lens surface of the anamorphic lens 6 is a two-dimensional polynomial aspherical surface (rotationally asymmetric surface) which is expressed by a polynomial regarding a height in the main scanning direction and a height in the auxiliary scanning direction. In the two-dimensional polynomial aspherical surface, the slope of the aspherical surface measured on a plane parallel to the auxiliary scanning cross section (that is, the slope of the normal line (on the plane) to the aspherical surface relative to the optical surface reference axis of the aspherical surface measured on the plane parallel to the auxiliary scanning cross section, hereinafter referred to as a "lens surface slope") changes as the distance from the auxiliary scanning cross section measured in the main scanning direction increases (that is, depending on the position on the lens surface measured in the main scanning direction).

Specifically, the aforementioned lens surface slope $\beta_0$ at a reference point (as the intersection of the optical path of the laser beam and the two-dimensional polynomial aspherical surface of the anamorphic lens 6 on the auxiliary scanning cross section) and the lens surface slope $\beta_y$ at a point a distance y apart from the reference point in the main scanning direction and on the optical path of the laser beam satisfy the following conditions (1) and (2):

$$0.70 < \beta_{ymax}/\beta_0 < 0.85 \quad (1)$$

$$0.85 < \beta_{0.5max}/\beta_0 < 0.95 \quad (2)$$

where "$y_{max}$" denotes the maximum value of the distance y within the scan range of the principal ray on the two-dimensional polynomial aspherical surface (i.e. a range on the two-dimensional polynomial aspherical surface through which the principal ray of the beam focusing on the scan target surface actually passes, measured in the main scanning direction), and "$0.5y_{max}$" denotes the half value of the maximum distance $y_{max}$.

The above conditions (1) and (2) mean that the lens surface slope changes depending on the position on the two-dimensional polynomial aspherical surface measured in the main scanning direction.

Further, curvature of the two-dimensional polynomial aspherical surface in the auxiliary scanning direction (i.e. curvature of the line of intersection of the two-dimensional polynomial aspherical surface and a plane parallel to the auxiliary scanning cross section, hereinafter referred to as "lens surface curvature") also changes depending on the position on the lens surface measured in the main scanning direction, independently of the lens surface slope.

Specifically, the lens surface curvature $CZ_0$ at the reference point and the lens surface curvature $CZ_{ymax}$ at the point the maximum distance $y_{max}$ apart from the reference point in the main scanning direction and on the optical path of the laser beam satisfy the following condition (3):

$$0.75 < CZ_{ymax}/CZ_0 < 0.85 \quad (3)$$

The above-condition (3) means that the lens surface curvature ($CZ_y$) is set independently of the lens surface slope ($\beta_y$).

Within the range (in the main scanning direction) on the lens surface of the anamorphic lens 6 through which the principal ray actually passes, magnification $mz_0$ of the imaging optical system in the auxiliary scanning direction on the optical surface reference axis and magnification mz of the imaging optical system in the auxiliary scanning direction at an arbitrary position satisfy the following condition (4):

$$0.9 < mz/mz_0 < 1.1 \quad (4)$$

Under the above condition (4), the change in the spot diameter on the scan target surface S measured in the auxiliary scanning direction is kept within ±10%.

By configuring the lens surface of the anamorphic lens 6 in the shape fulfilling the above conditions, the magnification of the imaging optical system (composed of the curved mirror 5 and the anamorphic lens 6) in the auxiliary scanning direction can be kept constant regardless of the incident position of the laser beam on the imaging optical system measured in the main scanning direction, by which the aforementioned F number variation can be suppressed excellently even when a rotationally symmetrical reflecting surface is employed for the curved mirror 5.

The laser beam emitted by the laser light source 1 passes through the collimator lens 2 and the cylindrical lens 3. The laser beam emerging from the cylindrical lens 3 is bent by the bending mirror 7a, incident upon a reflecting surface of the revolving polygon mirror 4 at a prescribed angle in the auxiliary scanning direction (½ of the separation angle α), and dynamically deflected by the reflecting surface. The laser beam dynamically deflected by the polygon mirror 4 is then incident upon the curved mirror 5 at a prescribed angle in the auxiliary scanning direction (½ of the separation angle β) and reflected by the reflecting surface. The laser beam reflected by the curved mirror 5 is then incident upon the anamorphic lens 6. The laser beam which passed through the anamorphic lens 6 is bent by the bending mirror 7b and draws a linear trace (scan line) on the scan target surface S according to the revolution of the polygon mirror 4. Since the scan target surface S itself is moved in the auxiliary scanning direction (orthogonal to the main scanning direction) at a constant speed, a plurality of scan lines are formed on the scan target surface S at even intervals. The laser beam repetitively scanned on the scan target surface S has been on ON-OFF modulated by an unshown modulator (or the laser light source 1 itself) according to image information, by which a two-dimensional image based on the image information is drawn on the scan target surface S.

Incidentally, in regard to the main scanning direction, the laser beam after passing through the cylindrical lens 3 is reflected by the polygon mirror 4 intact as a parallel beam and is then focused on the scan target surface S by the convergence power of the curved mirror 5. In the auxiliary scanning direction, the laser beam is once focused in the vicinity of a reflecting surface of the polygon mirror 4 by the convergence power of the cylindrical lens 3, reflected by the reflecting surface of the curved mirror 5 as a diverging beam, incident on the anamorphic lens 6, and focused again on the scan target surface S by the convergence power of the anamorphic lens 6. Meanwhile, the vicinity of the reflecting surface of the polygon mirror 4 and the scan target surface S are set optically conjugate with each other in the auxiliary scanning direction by the anamorphic lens 6, by which deviation of scan position on the scan target surface S in the auxiliary scanning direction which is generally caused by a slight tilt of each reflecting surface of the polygon mirror 4 (the so-called "optical face angle error") is corrected. By the correction by the optically conjugate relationship, the laser beam scans on the same line on the scan target surface S regardless of which reflecting surface of the polygon mirror 4 reflects the laser beam. Further, with the configuration of the anamorphic lens 6 described above, the F number variation can be corrected and suppressed excellently even when the curved mirror 5 is formed in a rotationally symmetrical shape. In other words, the spot diameter of the laser beam focusing on the scan target surface S is kept substantially constant regardless of the incident position of the laser beam on the imaging optical system (composed of the curved mirror 5 and the anamorphic lens 6) measured in the main scanning direction.

In the following, several specific examples of the reflective scanning optical system according to the embodiment of the present invention will be described in detail. Incidentally, the following explanation will be given omitting the bending mirrors 7a and 7b and unfolding the optical path of the laser beam for the sake of simplicity.

EXAMPLE 1

The following Table 1 shows the specific numerical configuration of a reflective scanning optical system according to a first example of the embodiment. FIG. 2 is a schematic diagram showing the composition of the scanning optical system of the first example (regarding the main scanning direction) seen in the auxiliary scanning direction.

TABLE 1

| Surface number | Radius of curvature | | Surface distance | Refractive index | element |
| --- | --- | --- | --- | --- | --- |
| | Ry | Rz | | | |
| 1 | ∞ | 55.424 | 2.00 | 1.48617 | Cylindrical lens |
| 2 | ∞ | | 113.00 | | |
| 3 | | | 50.00 | | Polygonal mirror |
| 4 | −255.000 | | 76.80 | | Curved mirror |
| 5 | −509.645 | Table 3 | 5.00 | 1.48617 | Anamorphic lens |
| 6 | 1627.112 | | 50.67 | | |

The focal length of the whole scanning optical system is 135.5 mm, and the effective scan width on the scan target surface S is 216 mm. In Table 1, the "SURFACE NO." is assigned to each optical surface in ascending order along the optical path of the laser beam starting from the inlet surface (upon which the laser beam is incident) of the cylindrical lens 3 as the surface No. 1. Concretely, No. 1 and No. 2 denote front and rear surfaces of the cylindrical lens 3, No. 3 denotes a reflecting surface of the polygon mirror 4, No. 4 denotes the reflecting surface of the curved mirror 5, and No. 5 and No. 6 denote front and rear surfaces of the anamorphic lens 6. Data of the scan target surface S are omitted.

The character "Ry" in Table 1 denotes the curvature radius [mm] in the main scanning direction, "Rz" denotes the curvature radius [mm] in the auxiliary scanning direction, "SURFACE DISTANCE" denotes the distance [mm] between the optical surface and the next optical surface measured on the optical axis, and "REFRACTIVE INDEX" denotes the refractive index of a medium between the optical surface and the next optical surface at the design wavelength 780 nm. When the optical surface is a rotationally symmetrical surface or a plane surface, the value of Rz is omitted since Rz=Ry. In this example, the separation angle α shown in FIG. 3 (the angle of upward reflection (as in FIGS. 1 and 3) of the laser beam by the reflecting surface of the polygon mirror 4 in the auxiliary scanning cross section) is 8 degrees, and the separation angle β shown in FIG. 3 (the angle of upward reflection (as in FIGS. 1 and 3) of the laser beam by the curved mirror 5 in the auxiliary scanning cross section) is 10 degrees.

In the first example, the front surface (No. 1) and the rear surface (No. 2) of the cylindrical lens 3 are formed as a cylindrical surface and a plane surface, respectively. The reflecting surface (No. 4) of the curved mirror 5 and the front surface (No. 5) of the anamorphic lens 6 are formed as concave rotationally symmetrical aspherical surfaces. The rear surface (No. 6) of the anamorphic lens 6 is formed as a two-dimensional polynomial aspherical surface.

The shape of each rotationally symmetrical aspherical surface is expressed by the following expression:

$$X(h)=Ch^2/[1+\{1-(1+\kappa)C^2h^2\}^{1/2}]+A_4h^4+A_6h^6+A_8h^8 \quad (5)$$

where X(h) denotes a SAG amount of a point on the aspherical surface whose height from the optical surface reference axis is h (SAG amount: distance measured from a tangential plane contacting the aspherical surface on the optical surface reference axis), "C" denotes curvature of the aspherical surface on the optical surface reference axis (1/r), "$\kappa$" denotes a cone constant, "$A_4$", "$A_6$" and "$A_8$" denote aspherical coefficients of fourth, sixth and eighth orders.

The cone constants $\kappa$ and aspherical coefficients $A_4$, $A_6$ and $A_8$ employed in the first example for the expression (5) for specifying the aspherical shapes of the reflecting surface of the curved mirror 5 (surface No. 4) and the front surface (inlet lens surface 61) of the anamorphic lens 6 (surface No. 5) will be shown in the following Table 2.

TABLE 2

|   | Surface No. 4 | Surface No. 5 |
|---|---|---|
| $\kappa$ | 5.9765 | 0.0 |
| A4 | 1.32902E−07 | −1.55579E−07 |
| A6 | −1.18638E−12 | 4.47379E−11 |
| A8 | −4.63572E−16 | −2.03939E−15 |

The two-dimensional polynomial aspherical surface is a curved optical surface whose SAG amount from the tangential plane (contacting the aspherical surface on the optical surface reference axis) is expressed by a polynomial of variables including two-dimensional coordinates (x, y) on the tangential plane regarding y direction (main scanning direction) and z direction (auxiliary scanning direction). In this case, the point of intersection of the tangential plane and the optical surface reference axis is the origin (surface center) which is set when the surface is designed. The shape of the two-dimensional polynomial aspherical surface is expressed by the following expression (6) in terms of the SAG amount X(y, z) of each point on the two-dimensional polynomial aspherical surface (having the coordinates (x, y)) measured from the tangential plane:

$$X(x, y)=1/Ry \cdot (y^2+z^2)/[1+\{1-(\kappa+1)(y^2+z^2)/Ry^2\}^{1/2}]+\Sigma b_{mn}y^m z^n \quad (6)$$

where "Ry" denotes the curvature radius [mm] in the main scanning direction (shown in Table 1), "$\kappa$" denotes a cone constant, and "$b_{mn}$" notes an aspherical coefficient of m-th and n-th orders in the main and auxiliary scanning directions respectively. The aspherical coefficients Bmn employed in the first example for the expression (6) for specifying the aspherical shape of the rear surface (outlet lens surface 62) of the anamorphic lens 6 (surface No. 6) will be shown in the following. Table 3.

TABLE 3

| | n | | |
|---|---|---|---|
| m | 0 | 1 | 2 |
| 0 |  | −1.33609E−01 | −2.71230E−02 |
| 1 | 0.00000E−00 | 0.00000E−00 | 0.00000E−00 |
| 2 | −1.48659E−04 | 6.17337E−06 | 6.72737E−07 |
| 3 | 0.00000E−00 | 0.00000E−00 | 0.00000E−00 |

TABLE 3-continued

| | n | | |
|---|---|---|---|
| m | 0 | 1 | 2 |
| 4 | −3.27808E−07 | −5.72059E−10 | −5.94667E−12 |
| 5 | 0.00000E−00 | 0.00000E−00 | 0.00000E−00 |
| 6 | 4.00917E−11 | 6.42967E−14 | 4.98566E−15 |
| 7 | 0.00000E−00 | 0.00000E−00 | 0.00000E−00 |
| 8 | −1.21290E−15 | −2.73355E−18 | 0.00000E−00 |

In Table 3, the values shown in the column of the 0th order in the auxiliary scanning direction (n=0) indicate the change in the shape of the lens surface in a cross section that contains the optical surface reference axis of the two-dimensional polynomial aspherical surface and that is parallel to the main scanning direction, and the values shown in the column of the 1st order in the auxiliary scanning direction (n=1) indicate the change in the slope of the lens surface. The values shown in the column of the 2nd order in the auxiliary scanning direction (n=2) indicate the change in the curvature of the lens surface. As shown in Table 3, the slope and curvature of the lens surface change independently of each other.

Substituting the specific values of the second example configured as above ($\beta_0$=−0.134, $\beta_{0.5ymax}$=−0.124, $\beta_{ymax}$=−0.103, $CZ_0$=−0.052, $CZ_{ymax}$=−0.041) into the values of the conditions (1)-(3) gives $\beta_{ymax}/\beta_0$=0.769, $\beta_{0.5ymax}/\beta_0$=0.925, and $CZ_{ymax}/CZ_0$=0.788. Therefore, the first example satisfies the conditions (1)-(3).

Figure 4A:
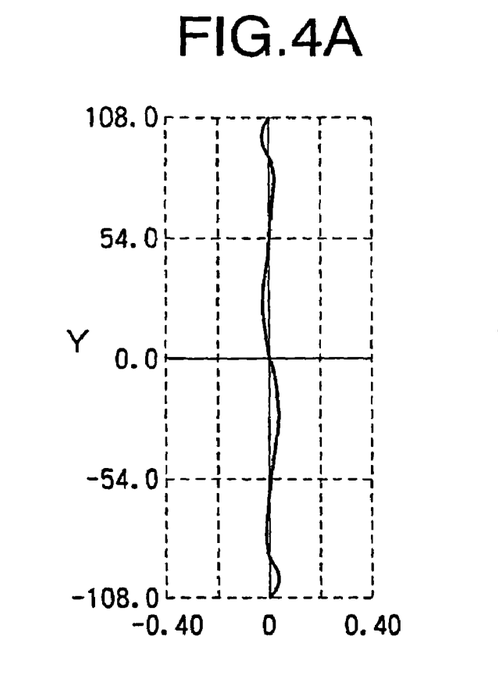
FIGS. 4A through 4D are graphs showing optical performance of a reflective scanning optical system according to a first example of the embodiment.
Figure 4B:
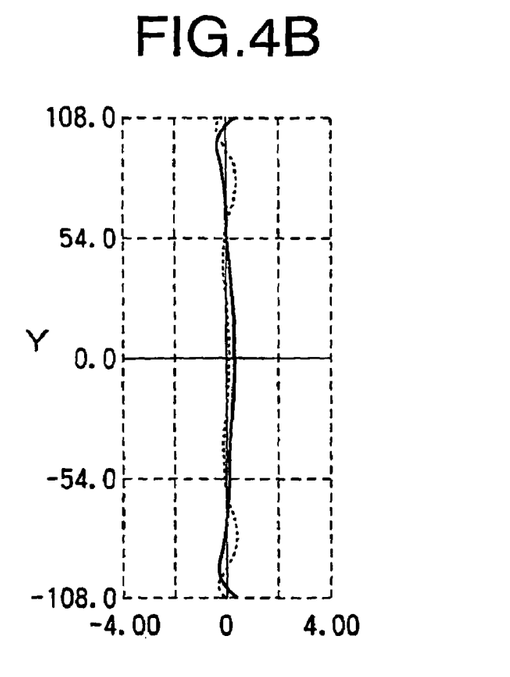
Figure 4C:
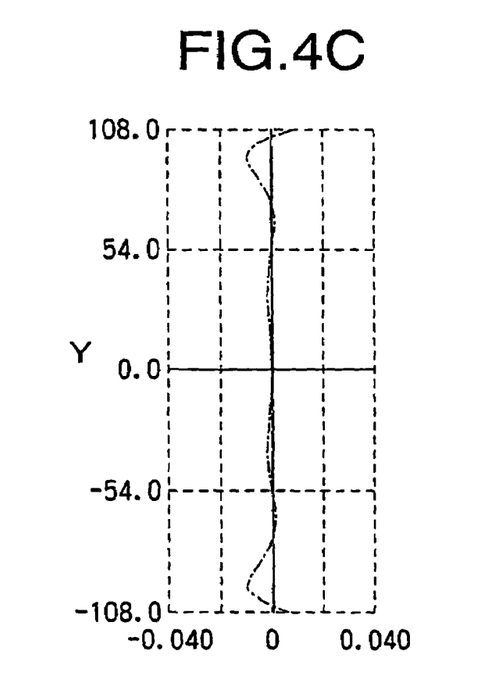
Figure 4D:
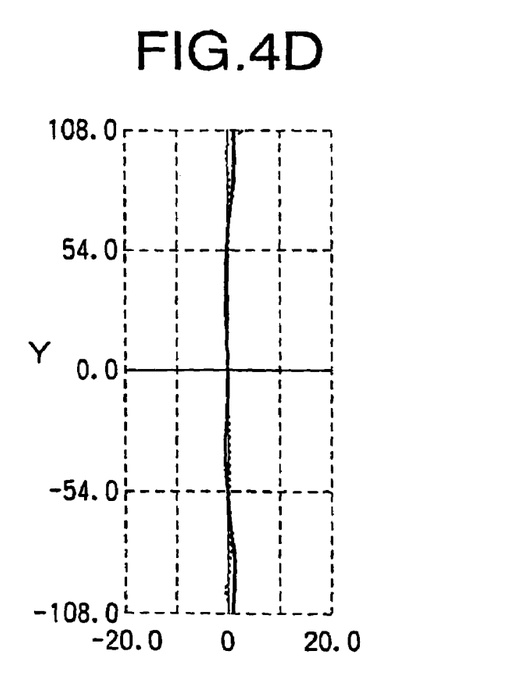

FIGS. 4A through 4D are graphs showing optical performance of the reflective scanning optical system of the first example, in which FIG. 4A shows f$\theta$ error (deviation of the beam spot on the scan target surface S from an ideal position measured in the main scanning direction), FIG. 4B shows field curvature (deviation of focusing position from an ideal plane measured in the optical axis direction) regarding the main scanning direction (dotted line) and the auxiliary scanning direction (solid line), FIG. 4C shows scan line curvature (Bow), and FIG. 4D shows the F number variation. In each graph, the vertical axis (Y axis) represents scan position [mm] in the main scanning direction, and the horizontal axis represents the amount of aberration ([mm] in FIGS. 4A-4C, [%] in FIG. 4D). In FIG. 4D, the dotted line indicates the F number variation in the main scanning direction and the solid line indicates the F number variation in the auxiliary scanning direction.

As seen in FIGS. 4A-4C, in the reflective scanning optical system of the first example, the Bow is corrected excellently while satisfying basic scanning performance (f$\theta$ characteristics, field curvature) required of the scanning optical system. Further, the F number variation is suppressed to an extremely low level as shown in FIG. 4D. Since the F number variation on the scan target surface S (the change in the spot diameter in the auxiliary scanning direction) is suppressed far below ±10% as shown in FIG. 4D, the reflective scanning optical system of the first example satisfies the condition (4).

EXAMPLE 2

Figure 5:
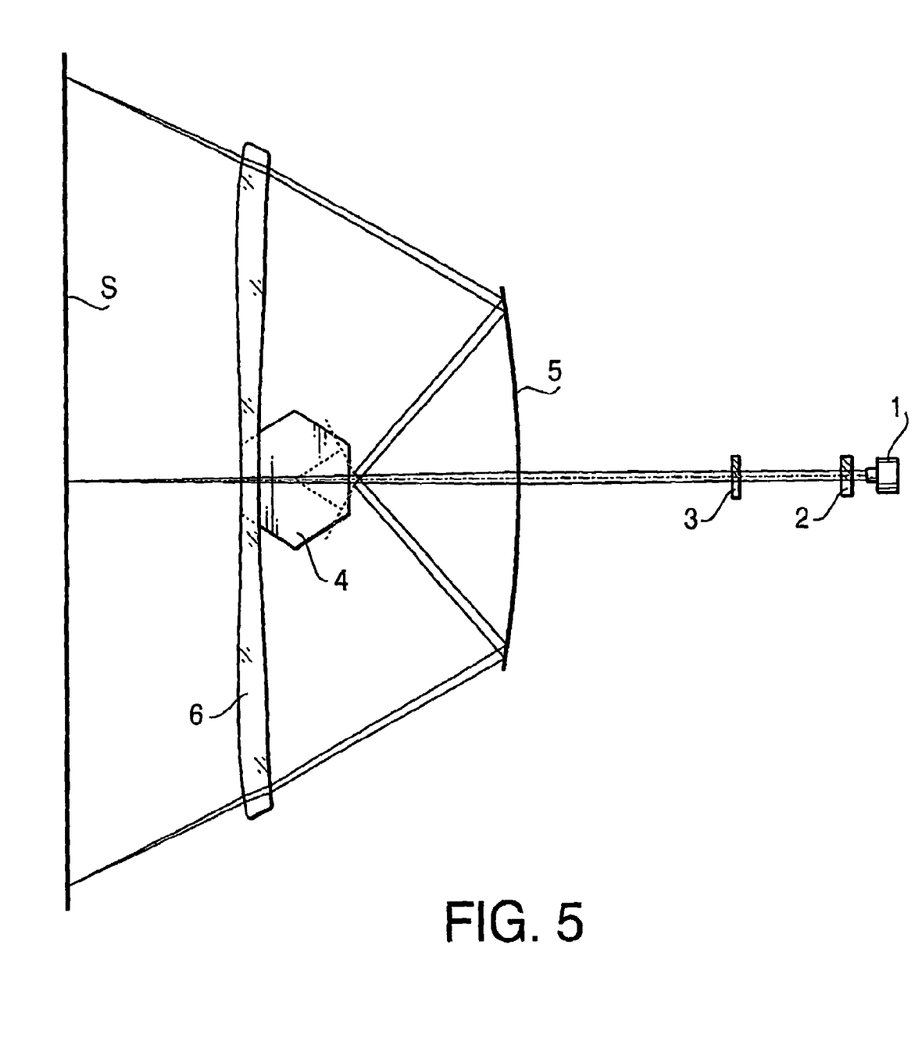
FIG. 5 is a schematic diagram showing the composition of a reflective scanning optical system according to a second example of the embodiment seen in the auxiliary scanning direction.

Next, the specific numerical configuration of a reflective scanning optical system according to a second example of the embodiment will be described. The following Table 4 shows the specific numerical configuration of the reflective scanning optical system of the second example. FIG. 5 is a schematic diagram showing the composition of the reflective scanning optical system of the second example (regarding the main scanning direction) seen in the auxiliary scanning direction.

TABLE 4

| Surface number | Radius of curvature | | Surface distance | Refractive index | element |
|---|---|---|---|---|---|
| | Ry | Rz | | | |
| 1 | ∞ | 55.424 | 2.00 | 1.48617 | Cylindrical lens |
| 2 | ∞ | | 113.00 | | |
| 3 | | | 50.00 | | Polygonal mirror |
| 4 | −255.048 | | 76.80 | | Curved mirror |
| 5 | −366.513 | Table 6 | 5.00 | 1.48617 | Anamorphic lens |
| 6 | 1203.005 | | 49.11 | | |

The meaning of each column of Table 4 is the same as that of Table 1. The focal length of the whole scanning optical system is 135.5 mm, and the effective scan width on the scan target surface S is 216 mm.

In the second example, the front surface (No. 1) and the rear surface (No. 2) of the cylindrical lens 3 are formed as a cylindrical surface and a plane surface, respectively. The reflecting surface (No. 4) of the curved mirror 5 is formed as a concave rotationally symmetrical aspherical surface. The front surface (No. 5) and the rear surface (No. 6) of the anamorphic lens 6 are formed as a two-dimensional polynomial aspherical surface and a convex rotationally symmetrical aspherical surface, respectively.

The cone constants κ and aspherical coefficients $A_4$, $A_6$ and $A_8$ employed in the second example for the expression (5) for specifying the aspherical shapes of the reflecting surface of the curved mirror 5 (surface No. 4) and the rear surface (outlet lens surface 62) of the anamorphic lens 6 (surface No. 6) will be shown in the following Table 5.

TABLE 5

| | Surface No. 4 | Surface No. 6 |
|---|---|---|
| κ | 9.1605 | 0.0 |
| A4 | 1.80195E−07 | −6.47353E−08 |
| A6 | −9.22076E−12 | 8.03694E−12 |
| A8 | 2.38803E−15 | −1.34469E−15 |

The aspherical coefficients Bmn employed in the second example for the expression (6) for specifying the aspherical shape of the front surface (inlet lens surface 61) of the anamorphic lens 6 (surface No. 5) will be shown in the following Table 6.

TABLE 6

| | n | | |
|---|---|---|---|
| m | 0 | 1 | 2 |
| 0 | | −1.31911E−01 | 2.78955E−02 |
| 1 | 0.00000E−00 | 0.00000E−00 | 0.00000E−00 |
| 2 | 1.57977E−04 | −6.59973E−06 | −1.05102E−06 |
| 3 | 0.00000E−00 | 0.00000E−00 | 0.00000E−00 |
| 4 | 1.85125E−07 | 2.17709E−10 | 4.29288E−11 |
| 5 | 0.00000E−00 | 0.00000E−00 | 0.00000E−00 |
| 6 | −5.57457E−12 | 5.93752E−14 | −8.55545E−16 |
| 7 | 0.00000E−00 | 0.00000E−00 | 0.00000E−00 |
| 8 | −1.03632E−15 | −4.87036E−18 | 0.00000E−00 |

As shown in Table 6, the slope and curvature of the lens surface change independently of each other.

Substituting the specific values of the second example composed as above ($\beta_0$=0.132, $\beta_{0.5ymax}$=0.122, $\beta_{ymax}$=0.106, $CZ_0$=0.052, $CZ_{ymax}$=0.042) into the values of the conditions (1)-(3) gives $\beta_{ymax}/\beta_0$=0.803, $\beta_{0.5ymax}/\beta_0$=0.924, and $CZ_{ymax}/CZ_0$=0.808. Therefore, the second example satisfies the conditions (1)-(3).

Figure 6A:
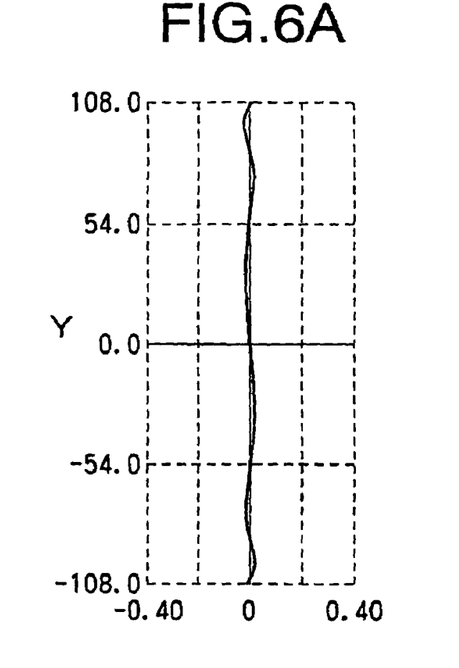
FIGS. 6A through 6D are graphs showing optical performance of the reflective scanning optical system of the second example.
Figure 6B:
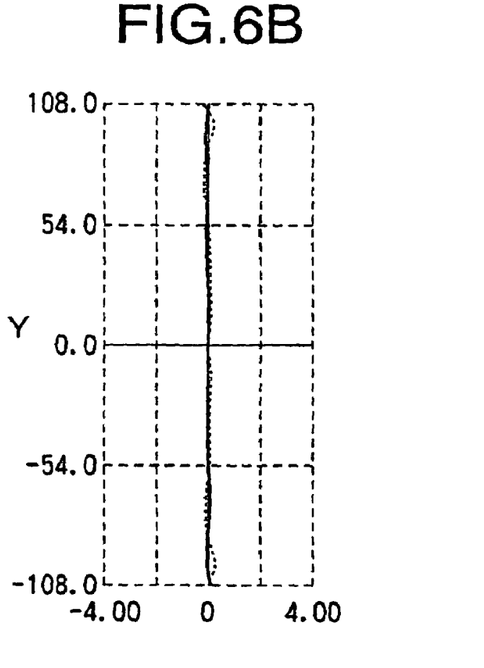
Figure 6C:
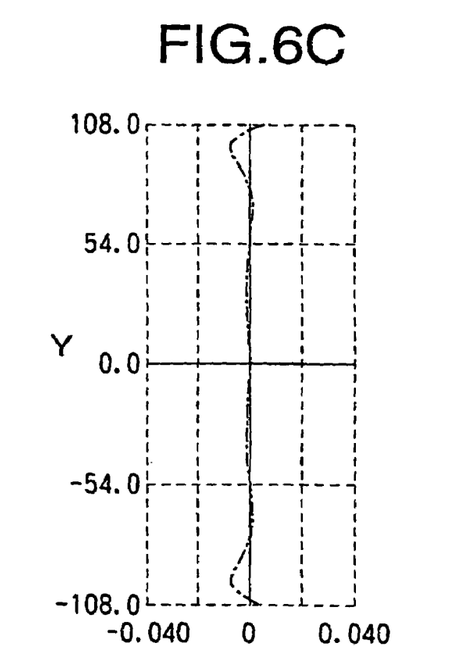
Figure 6D:
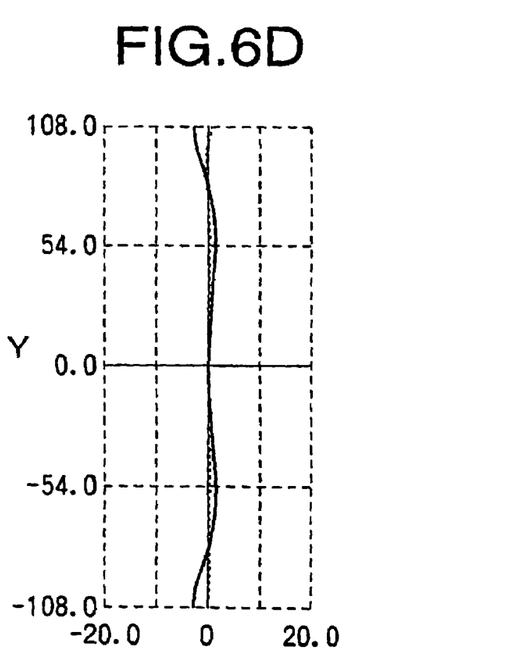

FIGS. 6A through 6D are graphs showing optical performance of the reflective scanning optical system of the second example, in which FIG. 6A shows the fθ error, FIG. 6B shows the field curvature, FIG. 6C shows the scan line curvature (Bow), and FIG. 6D shows the F number variation.

As shown in FIGS. 6A-6D, in the reflective scanning optical system of the second example, the Bow is corrected satisfactorily and the F number variation is also suppressed excellently while satisfying basic scanning performance (fθ characteristics, field curvature) required of the scanning optical system, similarly to the first example. As seen in FIG. 6D, also the reflective scanning optical system of the second example satisfies the condition (4).

EXAMPLE 3

Figure 7:
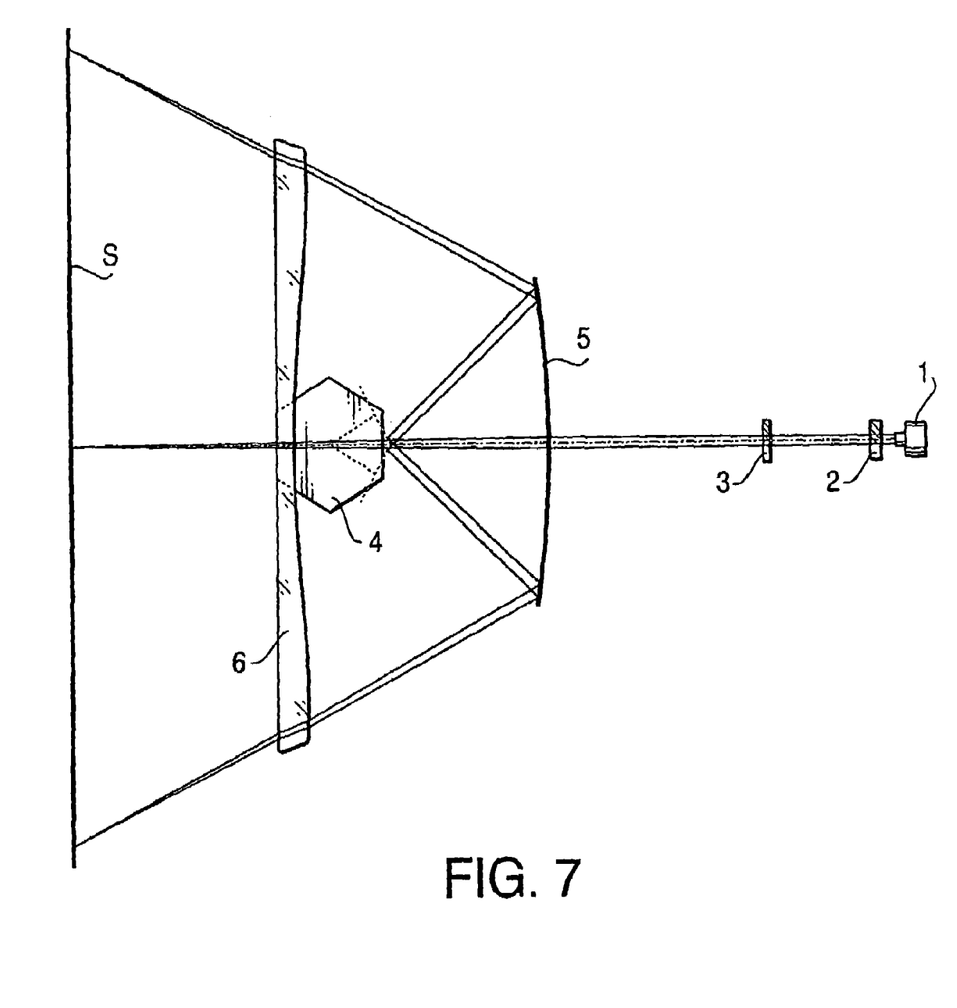
FIG. 7 is a schematic diagram showing the composition of a reflective scanning optical system according to a third example of the embodiment seen in the auxiliary scanning direction.

Next, the specific numerical configuration of a reflective scanning optical system according to a third example of the embodiment will be described. The following Table 7 shows the specific numerical configuration of the reflective scanning optical system of the third example. FIG. 7 is a schematic diagram showing the composition of the reflective scanning optical system of the third example (regarding the main scanning direction) seen in the auxiliary scanning direction.

TABLE 7

| Surface number | Radius of curvature | | Surface distance | Refractive index | element |
|---|---|---|---|---|---|
| | Ry | Rz | | | |
| 1 | ∞ | 55.424 | 2.00 | 1.48617 | Cylindrical lens |
| 2 | ∞ | | 113.00 | | |
| 3 | | | 50.00 | | Polygonal mirror |
| 4 | −267.378 | | 76.80 | | Curved mirror |
| 5 | −247.347 | Table 9 | 5.00 | 1.48617 | Anamorphic lens |
| 6 | ∞ | | 60.69 | | |

The meaning of each column of Table 7 is the same as that of Table 1. The focal length of the whole scanning optical system is 150.0 mm, and the effective scan width on the scan target surface S is 216 mm.

In the third example, the front surface (No. 1) and the rear surface (No. 2) of the cylindrical lens 3 are formed as a cylindrical surface and a plane surface, respectively. The reflecting surface (No. 4) of the curved mirror 5 is formed as a concave rotationally symmetrical aspherical surface. The front surface (No. 5) and the rear surface (No. 6) of the anamorphic lens 6 are formed as a two-dimensional polynomial aspherical surface and a plane surface, respectively.

The cone constants κ and aspherical coefficients $A_4$, $A_6$ and $A_8$ employed in the third example for the expression (5) for specifying the aspherical shape of the reflecting surface of the curved mirror 5 (surface No. 4) will be shown in the following Table 8.

TABLE 8

| | Surface No. 4 |
|---|---|
| κ | 10.8448 |
| A4 | 1.63257E−07 |

TABLE 8-continued

| | Surface No. 4 |
|---|---|
| A6 | 2.26625E−14 |
| A8 | −7.14384E−16 |

The aspherical coefficients Bmn employed in the third example for the expression (6) for specifying the aspherical shape of the front surface (inlet lens surface 61) of the anamorphic lens 6 (surface No. 5) will be shown in the following Table 9.

TABLE 9

| | n | | |
|---|---|---|---|
| m | 0 | 1 | 2 |
| 0 | | −1.21048E−01 | 2.47269E−02 |
| 1 | 0.00000E−00 | 0.00000E−00 | 0.00000E−00 |
| 2 | 1.27931E−04 | −6.72234E−06 | −6.58057E−07 |
| 3 | 0.00000E−00 | 0.00000E−00 | 0.00000E−00 |
| 4 | 2.31850E−07 | 3.60867E−10 | −4.82259E−11 |
| 5 | 0.00000E−00 | 0.00000E−00 | 0.00000E−00 |
| 6 | −9.52698E−13 | −1.70482E−14 | 7.54335E−15 |
| 7 | 0.00000E−00 | 0.00000E−00 | 0.00000E−00 |
| 8 | −7.09097E−16 | 1.88944E−18 | 0.00000E−00 |

As shown in Table 9, the slope and curvature of the lens surface change independently of each other.

Substituting the specific values of the third example composed as above ($\beta_0=0.121$, $\beta_{0.5ymax}=0.112$, $\beta_{ymax}=0.094$, $CZ_0=0.044$, $CZ_{ymax}=0.037$) into the values of the conditions (1)-(3) gives $\beta_{ymax}/\beta_0=0.777$, $\beta_{0.5ymax}/\beta_0=0.926$, and $CZ_{ymax}/CZ_0=0.841$. Therefore, the third example satisfies the conditions (1)-(3).

Figure 8A:
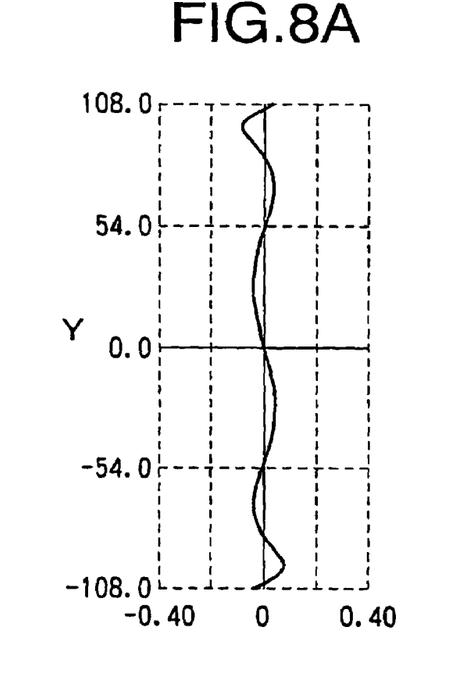
FIGS. 8A through 8D are graphs showing optical performance of the reflective scanning optical system of the third example.
Figure 8B:
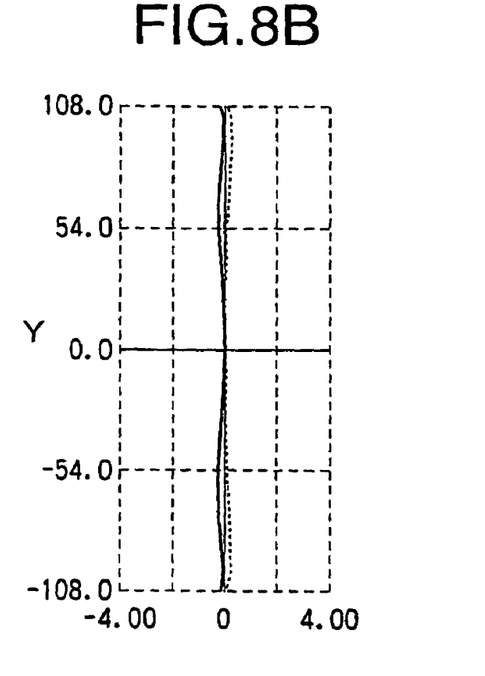
Figure 8C:
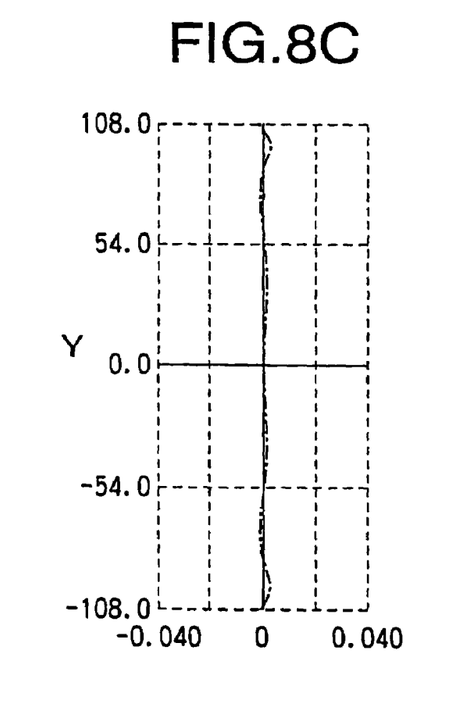
Figure 8D:
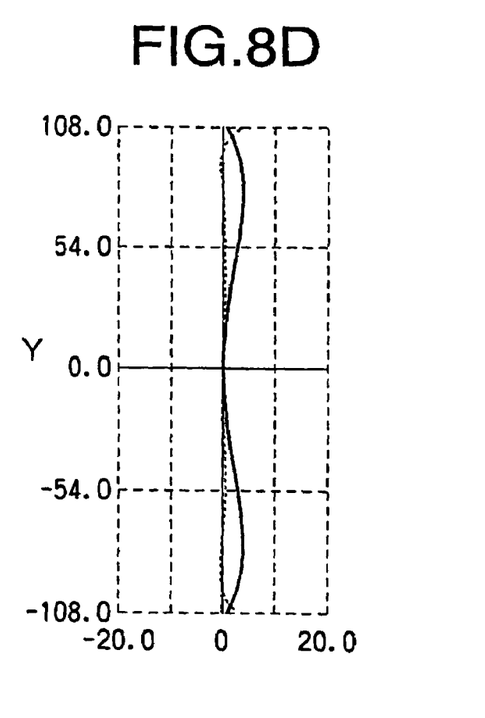

FIGS. 8A through 8D are graphs showing optical performance of the reflective scanning optical system of the third example, in which FIG. 8A shows the fθ error, FIG. 8B shows the field curvature, FIG. 8C shows the scan line curvature (Bow), and FIG. 8D shows the F number variation.

As shown in FIGS. 8A-8D, in the reflective scanning optical system of the third example, each aberration is suppressed to a low level while satisfying basic scanning performance required of the scanning optical system, similarly to the first example. As seen in FIG. 8D, also the reflective scanning optical system of the third example satisfies the condition (4).

As described above, in the reflective scanning optical system in accordance with the embodiment of the present invention, even when the imaging optical system of the reflective scanning optical system is composed of a curved mirror having a rotationally symmetrical reflecting surface configuration and an elongate lens having an anamorphic lens surface configuration, the change in the magnification of the imaging optical system in the auxiliary scanning direction can be reduced, by which the beam spot diameter on the scan target surface can be equalized, as well as equalizing the scan line interval on the scan target surface when the imaging optical system is applied to a multibeam scanning optical system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-172096, filed on Jun. 17, 2003, which is expressly incorporated herein by reference in its entirety.

What is claimed is:

1. A reflective scanning optical system for dynamically deflecting a laser beam emitted from a light source by each reflecting surface of a polygon mirror revolving at a constant angular speed and thereby scanning the laser beam on a scan target surface at a constant speed in a main scanning direction via an imaging optical system including a curved mirror for reflecting the dynamically deflected laser beam and an anamorphic lens on which the laser beam reflected by the curved mirror is incident, the laser beam being incident upon each reflecting surface of the revolving polygon mirror and the reflecting surface of the curved mirror at specific angles in an auxiliary scanning direction which is orthogonal to the main scanning direction, wherein the reflecting surface of the curved mirror has positive power in the main scanning direction, wherein the anamorphic lens has positive refractive power in the auxiliary scanning direction, and wherein at least one lens surface of the anamorphic lens is formed as a rotationally asymmetric surface on which slope and curvature of a line of intersection of the lens surface and a plane parallel to an auxiliary scanning cross section, as a plane containing an optical surface reference axis of the lens surface and parallel to the auxiliary scanning direction, change as the plane gets further from the auxiliary scanning cross section in the main scanning direction so that magnification of the imaging optical system in the auxiliary scanning direction for the laser beam will be constant regardless of the angle of deflection by the revolving polygon mirror.

2. The reflective scanning optical system according to claim 1, wherein slope $\beta_0$ of a normal line to the rotationally asymmetric surface at a reference point, as the intersection of the optical path of the laser beam and the rotationally asymmetric surface on the auxiliary scanning cross section, relative to the optical surface reference axis measured on the auxiliary scanning cross section and slope $\beta_y$ of a normal line to the rotationally asymmetric surface at a point on the rotationally asymmetric surface a distance y apart from the reference point in the main scanning direction and on the optical path of the laser beam relative to the optical surface reference axis measured on a plane parallel to the auxiliary scanning cross section satisfy the following conditions (1) and (2):

$$0.70 < \beta_{ymax}/\beta_0 < 0.85 \quad (1)$$

$$0.85 < \beta_{0.5ymax}/\beta_0 < 0.95 \quad (2)$$

where $y_{max}$ denotes the maximum value of the distance y within a scan range as a range on the rotationally asymmetric surface through which the laser beam focusing on the scan target surface passes and $0.5y_{max}$ denotes the half value of the maximum distance $y_{max}$.

3. The reflective scanning optical system according to claim 2, wherein curvature $CZ_0$ of a line of intersection of the rotationally asymmetric surface and the auxiliary scanning cross section at the reference point and curvature $CZ_{ymax}$ of a line of intersection of the rotationally asymmetric surface and a plane parallel to the auxiliary scanning cross section at the point the maximum distance $y_{max}$ apart from the reference point in the main scanning direction and on the optical path of the laser beam satisfy the following condition (3):

$$0.75 < CZ_{ymax}/CZ_0 < 0.85 \quad (3).$$

4. The reflective scanning optical system according to claim 1,
wherein the other lens surface of the anamorphic lens opposite to the rotationally asymmetric surface is a rotationally symmetrical aspherical surface, and
wherein magnification $mz_0$ of the imaging optical system in the auxiliary scanning direction on the optical surface reference axis and magnification mz of the imaging optical system in the auxiliary scanning direction for the laser beam focusing on the scan target surface at any image height satisfy the following condition (4):

$$0.9 < mz/mz_0 < 1.1 \qquad (4).$$

5. The reflective scanning optical system according to claim 1,
wherein the other lens surface of the anamorphic lens opposite to the rotationally asymmetric surface is a plane surface, and
wherein magnification $mz_0$ of the imaging optical system in the auxiliary scanning direction on the optical surface reference axis and magnification mz of the imaging optical system in the auxiliary scanning direction for the laser beam focusing on the scan target surface at any image height satisfy the following condition (4):

$$0.9 < mz/mz_0 < 1.1 \qquad (4).$$

6. The reflective scanning optical system according to claim 1, wherein the reflecting surface of the curved mirror is a rotationally symmetrical surface.

7. The reflective scanning optical system according to claim 1, wherein the rotationally asymmetric surface is a two-dimensional polynomial aspherical surface.

8. The reflective scanning optical system according to claim 1, wherein the revolving polygon mirror dynamically deflects a plurality of laser beams emitted by multiple light sources simultaneously.

* * * * *